United States Patent [19]

Hazebrouck

[11] Patent Number: 4,881,139
[45] Date of Patent: Nov. 14, 1989

[54] LATCH MECHANISM FOR ROTARY ACTUATOR AND THE LIKE

[75] Inventor: Henry B. Hazebrouck, Sunnyvale, Calif.

[73] Assignee: Priam Corporation, San Jose, Calif.

[21] Appl. No.: 183,457

[22] Filed: Apr. 14, 1988

Related U.S. Application Data

[63] Continuation of Ser. No. 694,708, Jan. 25, 1985, abandoned.

[51] Int. Cl.$^4$ .......................... G11B 5/54; G11B 21/16
[52] U.S. Cl. ................................ 360/105; 360/97.01; 360/106; 360/137; 335/236
[58] Field of Search ............. 360/106, 75, 86, 97.01 J, 360/97.03, 97.04, 98.01, 99.01, 99.07, 104–105, 137; 369/244, 257, 222; 292/201; 335/179, 236

[56] References Cited

U.S. PATENT DOCUMENTS

| | | | |
|---|---|---|---|
| 1,312,895 | 8/1919 | Derby | 292/201 |
| 2,883,487 | 4/1959 | Spaulding et al. | 335/179 |
| 3,312,492 | 4/1967 | Remhof | 292/201 |
| 3,415,562 | 12/1968 | Peterson | 16/48.5 X |
| 3,489,917 | 1/1970 | Gurol | 335/179 |
| 3,656,073 | 4/1972 | Wood et al. | 335/179 |
| 4,131,921 | 12/1978 | Gruczelak | 360/86 |
| 4,139,874 | 2/1979 | Shiraishi | 360/86 |
| 4,173,004 | 10/1979 | Woodlief | 335/236 |
| 4,428,607 | 1/1984 | Levine | 242/201 |
| 4,484,241 | 11/1984 | Brende et al. | 360/105 |
| 4,506,407 | 3/1985 | Downey | 16/48.5 |
| 4,562,500 | 12/1985 | Bygnes | 360/105 |
| 4,574,372 | 3/1986 | D'Arc | 369/244 |
| 4,581,597 | 4/1986 | Walley | 335/179 |
| 4,609,337 | 9/1986 | Wichterle et al. | 425/145 |
| 4,654,735 | 3/1987 | Izraelev et al. | 360/104 |

FOREIGN PATENT DOCUMENTS

| | | | |
|---|---|---|---|
| 0126973 | 4/1984 | European Pat. Off. | 360/75 |
| 57-135483 | 8/1982 | Japan | 360/105 |
| 2142465 | 1/1985 | United Kingdom | 369/44 |

OTHER PUBLICATIONS

Hearn, "Actuator Retraction Device", IBM TDB, vol. 19, No. 4, Sep. 1976.
Brende et al., "Magnetic Home Latch Assembly", IBM TDB, vol. 26, No. 3B, Aug. 1983.

Primary Examiner—John H. Wolff
Attorney, Agent, or Firm—Flehr, Hohbach, Test Albritton & Herbert

[57] ABSTRACT

A latch mechanism for use in a disc drive rotary actuator and like magnetic device includes a selectively energizable electromagnet mounted to the actuator and spaced from the magnets, and a ferrous arm pivotally attached between the magnets and the electromagnet whereby the latch arm can assume two stable positions of low magnetic reluctance for stray flux from the magnets. In one position the latch arm pivots towards the magnets and engages the rotary actuator. In the other position, the latch arm pivots towards the electromagnet and disengages the rotary actuator. Positioning of the latch arm is dependent on momentary energization and polarity of the electromagnet.

3 Claims, 3 Drawing Sheets

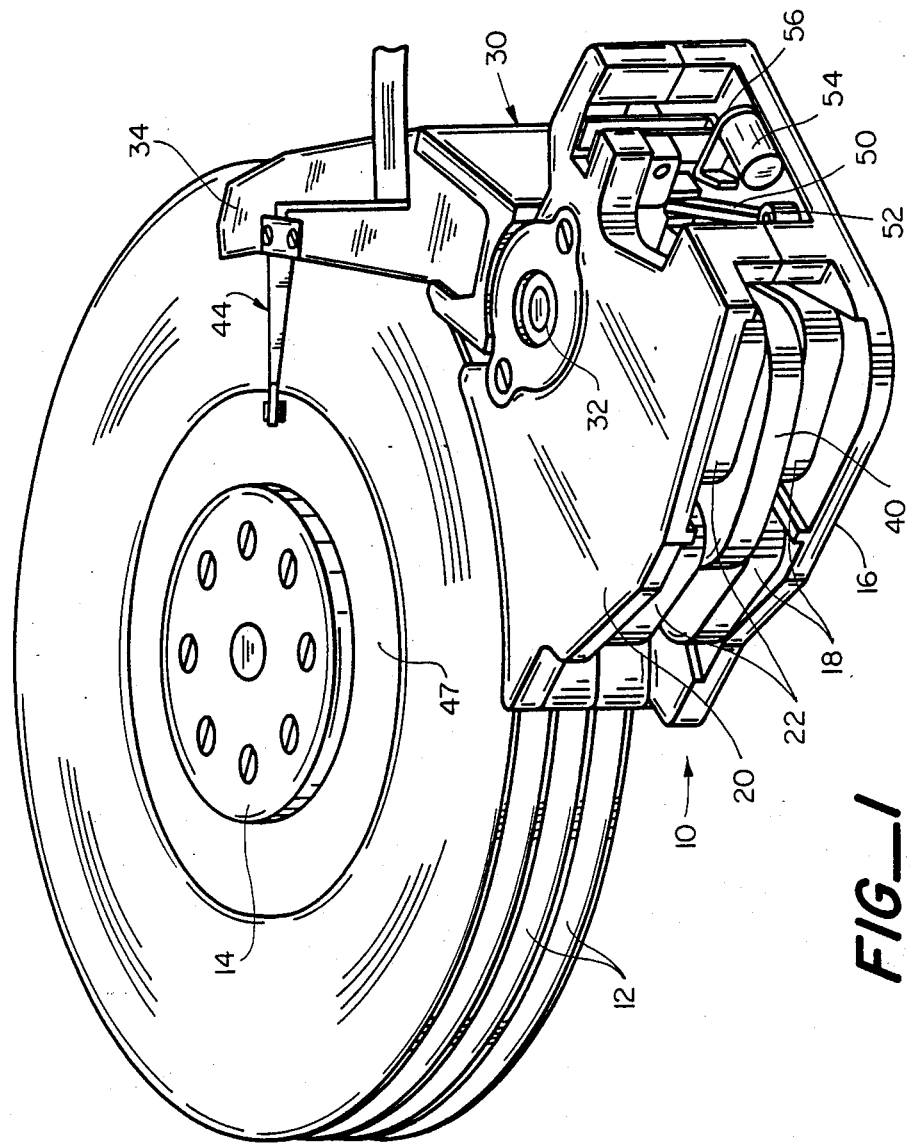
FIG_1

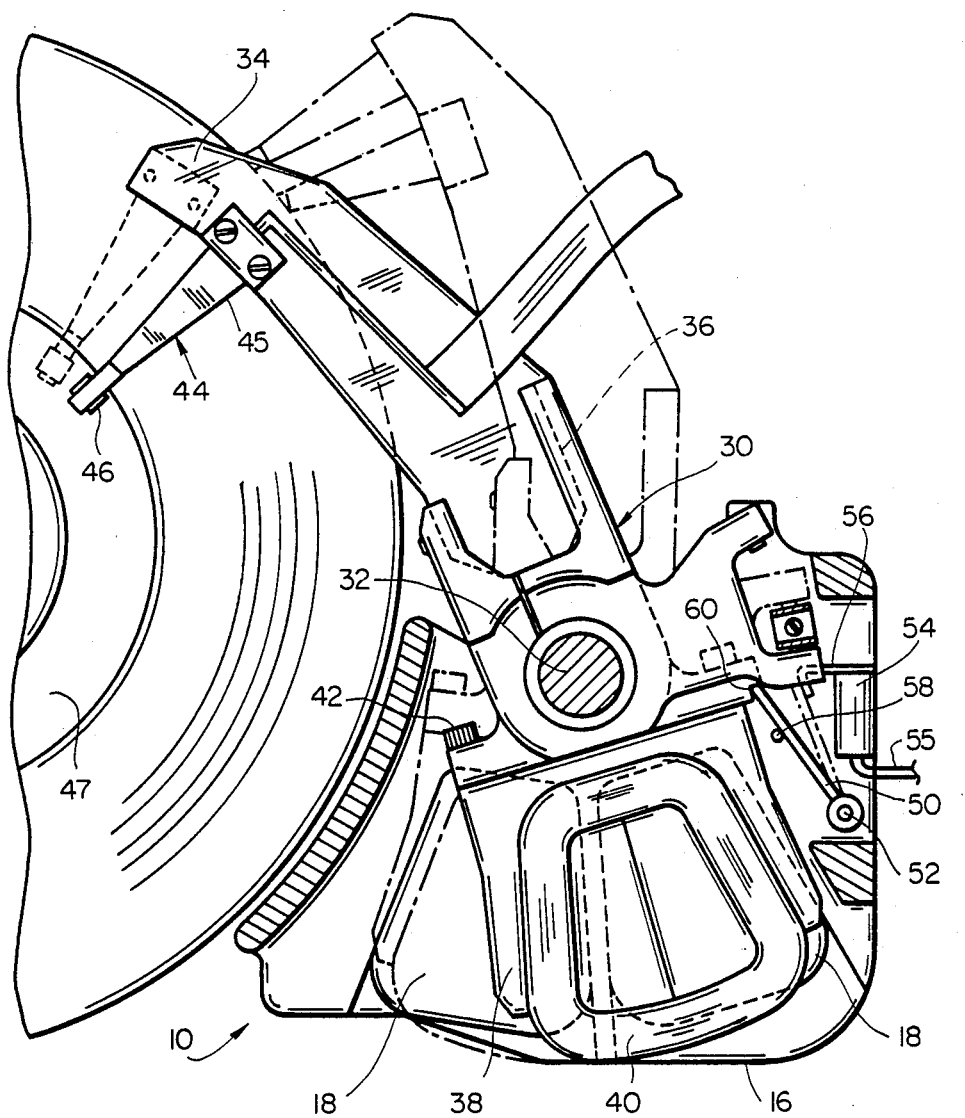
FIG_2

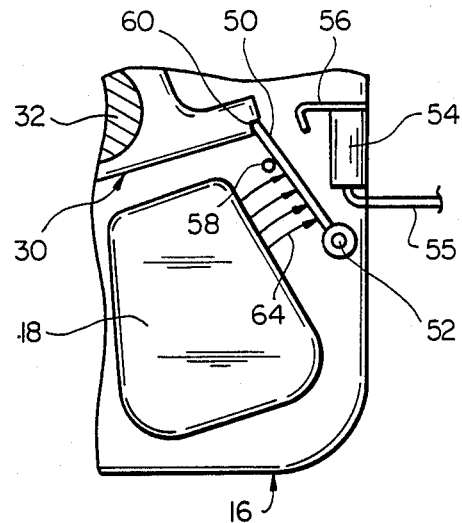
FIG_3A
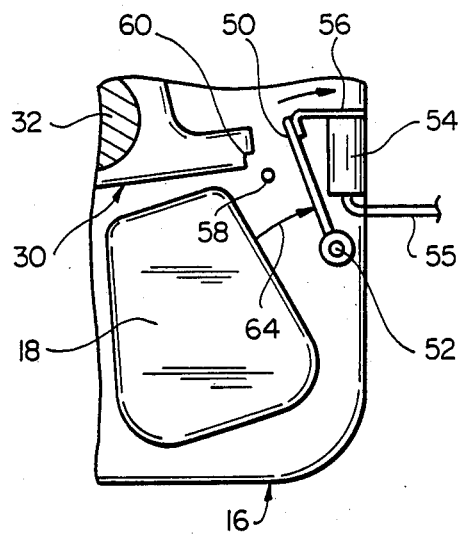
FIG_3B

LATCH MECHANISM FOR ROTARY ACTUATOR AND THE LIKE

This is a continuation of application Ser. No. 694,708 filed Jan. 25, 1985, now abandoned.

This application is related to the following co-pending applications:

Ser. No. 694,709, filed Jan. 25, 1985.—Rotary Actuator Having Removable Head Arms For Use In Magnetic Disc Drive, Henry B. Hazebrouck Ser. No. 694,797, filed Jan. 25, 1985.—Rotary Actuator Having Single Piece Support Structure, Henry B. Hazebrouck Ser. No. 694,704, filed Jan. 25, 1985.—Rotary Actuator Having Preloaded Spring Crash Stop, Henry B. Hazebrouck This invention relates generally to latch mechanisms for use in electromagnetic devices, and more particularly the invention relates to a latch mechanism for use in a disc drive rotary actuator and like devices.

Discs having magnetic coatings on the surface thereof provide memories for bits of data which can be randomly accessed at high speed for either retrieving or storing data. Typically, the heads are mounted on support arms with each head having a small pickup coil which is rapidly moved across a disc surface while a disc is spinning for detecting or storing data in a concentric data track on the disc surface. The heads ride on a thin layer of air created by the spinning disc with the heads being in close proximity to but spaced from the disc surface.

The actuators for the pickup heads can move the head arm assembly linearly across the disc surfaces or rotatably across the disc surfaces. When the disc drive is powered down the pickup heads are moved to an innermost position over a landing area of the disc surface. After power down the carriage assembly is locked with the pickup heads resting on the landing area so that the heads are not inadvertently moved across the disc surface.

Heretofore, latch mechanisms have typically comprised a lever mechanism driven by a spring loaded solenoid. If the latch is self-locking, a magnet must be provided within the solenoid to hold the latch in the retracted position. A manually operated mechanism is disclosed in U.S. Pat. No. 4,331,989 for "Magnetic Disc File Having Dual Lock Mechanism".

The present invention is directed to a simple latch mechanism which utilizes stray magnetic fields that exist in electromagnetic devices. The latch is made of ferrous material which is pivotally mounted between the magnets of the electromagnetic device and a selectively energizable electromagnet. The latch provides two paths of low magnetic reluctance for the stray flux emanating from the magnets. These two paths correspond to two different positions of the latch. In one position the latch pivots towards the magnets to a stop position provided by a non-ferrous pin. This position of the latch arm provides a low reluctance magnetic path for stray magnetic flux from the magnets and also engages and locks a movable mechanism. In the other position the latch disengages the movable mechanism and pivots towards the electromagnet to provide a second low reluctance magnetic path. The electromagnet is momentarily energized to cause the latch to pivot from one position to the other, the polarity of the electromagnet determining the direction of latch movement.

The latch mechanism has been implemented in a rotary actuator disc drive, and the invention will be described with reference thereto. However, the invention has applications in other electromagnet devices.

Accordingly, the invention and objects and features thereof will be more readily apparent from the following detailed description and appended claims when taken with the drawing, in which:

FIG. 1 is a perspective view of a rotary actuator and disc drive including a latch mechanism in accordance with the invention.

FIG. 2 is a top plan view partially in section illustrating the latch mechanism of FIG. 1 in a locked position and in an unlocked position.

FIG. 3A is a top plan view of the latch mechanism of FIG. 2 in the locked position and illustrates magnetic flux pattern.

FIG. 3B is a top plan view of the latch mechanism of FIG. 2 in the unlocked position illustrating magnetic flux pattern.

Referring now to the drawings, FIG. 1 is a perspective view of a rotary actuator shown generally at 10 for accessing and storing data on a plurality of discs 12 mounted on a spindle 14. The rotary actuator 10 includes a first magnet structure 16 which accommodates magnets 18 and a second magnet structure 20 which supports magnets 22. The magnet structures preferably comprise two ferrous pieces which are welded and brazed together to form a unitary structure. Alternatively, the support structure can be investment cast of a single piece.

The magnet structure supports a pivot block assembly which is illustrated in FIG. 1 and in the top plan view partially in section of FIG. 2. The pivot block 30 fits over and is fastened to a bearing support shaft 32 which is mounted to bearings in the support structure. The head arms 34 preferably fit into dovetail slots 36 on one side of the pivot block. On the opposite side of the block 30 is a coil holder 38 in which a coil 40 is mounted by suitable means such as epoxy. Coil holder 38 is preferably a separate piece which is fastened to the pivot block by means of bolts 42. The coil 40 is flat and is suitable for a low profile drive.

Mounted to one end of the arms 34 are pickup head assemblies 44. In FIG. 2 the support arms 34 and head assemblies 44 are shown in an innermost position with the pickup heads 46 at an innermost position over a landing area 47 of the disc surface. The outermost position of the head arms and pickup heads is illustrated by dotted lines.

A latch mechanism including a ferrous arm 50 pivoted to the support structure by a non-ferrous pin 52 is positioned between the magnets of the disc drive and an electromagnet 54 having electrical leads 55 and a ferrous arm 56 projecting therefrom. The arm 50 provides two paths of low magnet reluctance for the stray magnet flux from the magnets. In a first position, arm 50 pivots towards magnet 18 and engages a non-ferrous pin 58 to provide a low reluctance path from the magnet 58 through the arm 50 to the support structure 16. In the second position, the arm 50 pivots into engagement with arm 56 to provide a low reluctance path from the magnet 18 through arms 50 and 56 and electromagnet 54 to the support structure 16.

The arm 50 assumes one of the two positions upon the momentary energization of the electromagnet 54. Arm 50 moves from the first position to the second position engaging arm 56 when the electromagnet produces flux to magnetically attract arm 50. Arm 50 moves back to the first position when the electromagnet 54 is momentarily energized to produce flux in a direction opposing the flow of leakage flux through arm 56 and electromagnet 54. Arm 50 then pivots back to the first position engaging the pin 58. Both of the two positions are stable positions and the arm 50 will tend to stay in either position absent the momentary energization of electromagnet 54.

As further shown in FIG. 3A, the pivot block 30 includes a notch 60 which receives the pivot arm 50 when the rotary actuator moves the heads to the landing position for power down and locking of the actuator and arm 50 is pivoted to engage pin 58. Accordingly, the arm 50 engaging the notch 60 maintains the rotary actuator in a locked position with the pickup heads on the landing surface of the disc.

To unlock the latch mechanism, the electromagnet 54 is momentarily energized with the resulting flux being in the same direction as the stray flux and the arm 50 pivots to abut the arm 56 as shown in FIG. 3B. In this position the arm 50 assumes a position of low magnetic reluctance for the stray flux 64, which can easily pass through the arm 56 and the electromagnet 54 and return to the magnet through the support structure 16. Arm 50 remains in this position until electromagnet 50 is momentarily energized to produce flux opposing the above described flux path whereupon arm 50 pivots back into engagement with pin 58.

The latch mechanism in accordance with the invention is simple in structure yet has proved efficient in operation in a disc drive. Further, the elimination of a solenoid and its sliding surface eliminates contamination problems. While the invention has been described with reference to one embodiment of the invention, the description is illustrative and is not to be construed as limiting the invention. Various modifications and applications may occur to those skilled in the art without departing from the true spirit and scope of the invention as defined from the appended claims.

What is claimed is:

1. A rotary actuator for use in a disc drive comprising
a support structure for supporting a plurality of magnets in spaced relationship,
a plurality of actuator magnets mounted to said support structure for use in driving said rotary actuator,
a shaft supported by and rotatable in said support structure,
a pivot block assembly mounted to said shaft for rotation therewith, said pivot block assembly including a coil cooperatively arranged with said actuator magnets for driving said pivot block assembly, and
a bistable latch mechanism for selectively locking said pivot block assembly, said latch mechanism including an energizable electromagnet mounted to said support assembly and spaced from said actuator magnets, a ferrous latch arm for providing a low reluctance path for stray magnetic flux from said actuator magnets, means pivotally attaching said latch arm between said actuator magnets and said energizable electromagnet whereby said latch arm pivots towards said actuator magnets and engages said pivot block assembly in a first stable low reluctance path and said latch arm pivots towards said electromagnet and disengages said pivot block assembly in a second stable low reluctance path, said electromagnet being momentarily energized to effect flux through said latch arm and assuming either one polarity for pivoting said latch arm to said first stable low reluctance path or assuming an opposite polarity for pivoting said latch arm to said second stable low reluctance path, whereby upon deenergization of said electromagnet said pivot arm remains in the stable low reluctance path to which said pivot arm has been pivoted by the momentary energization of said electromagnet.

2. The rotary actuator as defined by claim 1 wherein said latch mechanism further includes a stop member for limiting travel of said pivot arm.

3. The rotary actuator as defined by claim 1 wherein said electromagnet includes a ferrus arm extending therefrom which is engaged by said latch arm.

* * * * *